Patented Dec. 4, 1951

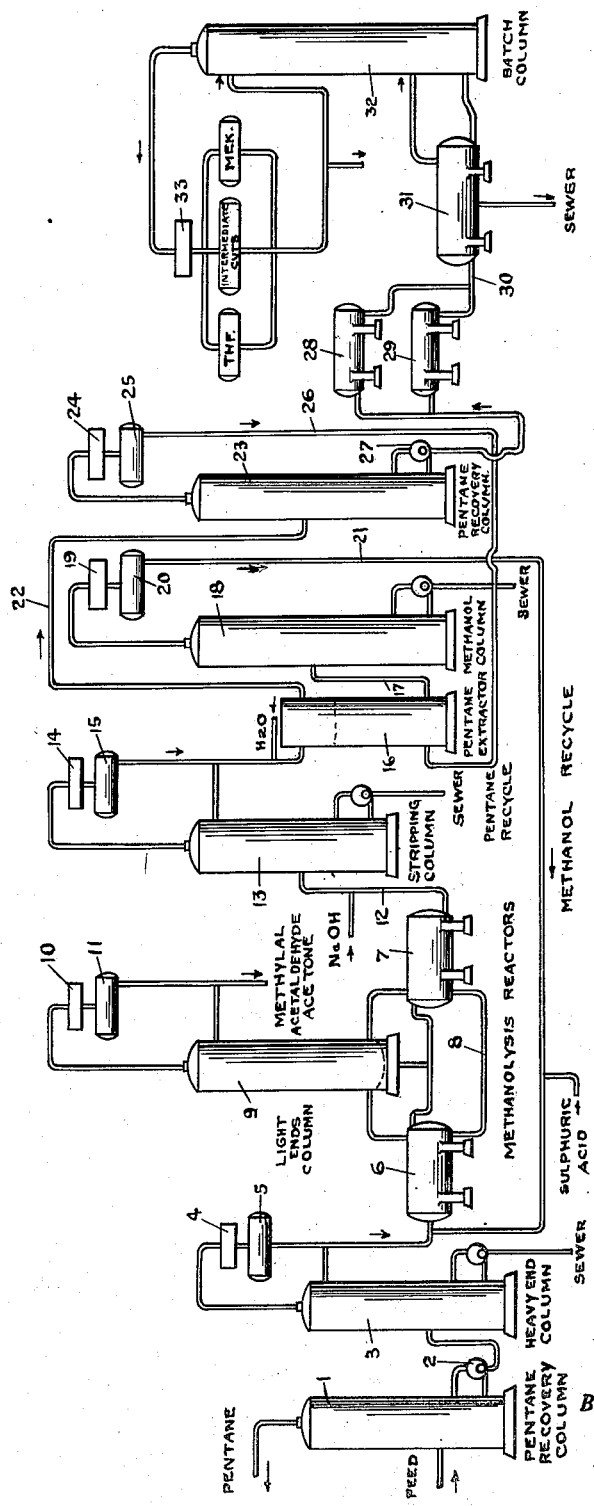

2,577,156

UNITED STATES PATENT OFFICE 2,577,156

SEPARATION PROCESS

Nat C. Robertson, Corpus Christi, Tex., assignor to Celanese Corporation of America, a corporation of Delaware Application June 15, 1948, Serial No. 33,030

6 Claims. (Cl. 260—452)

This invention relates to the production of purified organic compounds, and relates more particularly to the separation and purification of certain mixture of organic compounds obtained as a product of the vapor phase partial oxidation, with air or oxygen, of gaseous hydrocarbons, such as propane, butane, or mixtures thereof.

An object of my invention is the provision of an improved process for the separation of purified methyl ethyl ketone and tetrahydrofuran from a crude fraction of the mixture of products obtained on the vapor phase partial oxidation, with air or oxygen, of gaseous aliphatic hydrocarbons such as propane, butane or mixtures thereof.

Other objects of my invention will appear from the following detailed description and the accompanying drawing.

In the drawing, the figure is a schematic diagram or flow sheet of apparatus employed in connection with my novel process.

The vapor phase, partial oxidation of aliphatic hydrocarbons such as propane or butane, or mixtures thereof, employing air or oxygen as the oxidizing agent, yields a complex mixture of products including formaldehyde, acetaldehyde, methanol, propionaldehyde, allyl alcohol, acetone, methyl ethyl ketone, methylal, acrolein, tetrahydrofuran, 2 - methyltetrahydrofuran, various cyclic oxides, methyl formate and other esters, formals and acetals, as well as numerous other aliphatic compounds in varying amounts. In order to separate this complex mixture of oxidation products and to purify each of the components so that the same will be suitable for commercial use, an intricate product purification scheme is necessary. Many of the oxidation products present in the mixture not only boil within a relatively narrow temperature range but numerous constant boiling azeotropes are also formed which makes an efficient and economical separation even more difficult.

During the purification a number of crude fractions each containing a plurality of compounds is obtained. One such fraction comprises a mixture of tetrahydrofuran, 2-methyl tetrahydrofuran, methyl ethyl ketone, formals, acetals and oxides dissolved in pentane and obtained during an extractive distillation with pentane. The methyl ethyl ketone is present in the mixture, from which the pentane is easily stripped, in an appreciable amount but the recovery of the same in a highly purified form from the mixture remaining after the pentane is stripped off is quite difficult. This is due to the fact that certain of the acetals tend to remain with the methyl ketone as contaminants since their solubilities and other physical characteristics are very similar.

I have found that the methyl ethyl ketone may be separated from the aforementioned mixture in which it is present together with tetrahydrofuran, 2-methyl tetrahydrofuran and the several formals, acetals and oxides mentioned, in an efficient and economical manner and in a highly purified form if the fraction of said mixture boiling up to about 75° C. is separated therefrom, reacted with methanol in the presence of an acid catalyst, such as sulfuric acid, to effect a methanolysis of the formals and acetals present, and the reaction mixture obtained is then subjected to separation and purification.

The methanolysis of the formals and acetals acts to effect an alcohol exchange reaction whereby the formals and acetals are split and the higher alcohols and any glycols forming part of the molecule of the formals and acetals are replaced by methanol. The alcohol exchange reaction frees the higher alcohols and glycols and converts the higher formals and acetals to methyl formal and methyl acetals. The change in the molecular structure of said formals and acetals simplifies the separation of the same from the mixture due to the changes in molecular weight and physical characteristics of the formals and acetals which are thus obtained. Furthermore, any dimethylacetal produced is easily hydrolyzed to methanol and acetaldehyde if some water is present, and then separated from the mixture.

The separation and purification of the methanolysis reaction product obtained comprises removing the light ends boiling below about 60° C., including the methylal present and any acetaldehyde, neutralizing the column residue with sodium hydroxide, for example, stripping the neutralized residue of water, inorganic salts, glycols and higher acetals and oxides, extracting the methyl ethyl ketone, tetrahydrofuran and any acetone and methanol present, removing any methanol and acetone from the raffinate and recycling the same to the methanolysis reactor, azeotroping the pentane extract to remove the pentane, methanol and acetone therefrom and then separating the residue of methyl ethyl ketone, tetrahydrofuran and 2-methyl tetrahydrofuran into its components by a batch or by a continuous distillation.

The methanolysis of the formals and acetals present in the fraction of the crude mixture boiling up to about 75° C. is effected by adding from about 1 to 10% by weight of an inorganic acid catalyst such as sulfuric acid, hydrochloric acid, or acid salts such as aluminum chloride or ferric chloride to a mixture of the crude fraction with methanol in about equal volume and heating the reaction mixture at a temperature of about 50 to 85° C. for about 0.5 to 10 hours to ensure complete methanolysis. The speed of the methanolysis reaction has been found to be a function of the temperature. An increase in the reaction rate may be achieved, if desired, by carrying the methanolysis out under pressure. Thus, a superatmospheric pressure of, for example, 10 to 75 pounds per square inch gauge and temperatures of 80 to 120° C. have been found to be advantageous. Satisfactory results are obtained, however, employing normal atmospheric pressure with the temperature sufficiently high to maintain the mixture under reflux. The presence in the reaction mixture of up to about 10% by weight of water has been found to have no adverse effect upon the methanolysis reaction rate. Advantageously, the reflux may be controlled during the methanolysis reaction so that both the methylal present and that formed as a product of the methanolysis reaction are continuously removed as the reaction proceeds. The removal of the methylal allows the reaction to proceed more nearly to completion since the equilibrium is thus favorably shifted.

In order further to illustrate my invention but without being limited thereto the following example is given:

*Example*

A crude mixture of a portion of the reaction products of the vapor phase oxidation of butane with air or oxygen and comprising essentially a mixture of tetrahydrofuran, 2-methyl tetrahydrofuran, methyl ethyl ketone, and various formals, acetals and oxides in solution in pentane is introduced into a fractionating column 1, as shown in the accompanying drawing, and the pentane continuously distilled off. A side stream of the residue is removed from the reboiler 2 of column 1 and subjected to further fractionating in a fractionating column 3 where the fraction boiling up to about 75° C. is removed, a suitable condenser 4 and receiver 5 being provided for said column. The fraction separated in column 3 is passed into a reactor 6 where it is mixed with an equal volume of methanol and 5% by weight of concentrated sulfuric acid is added. The reaction mixture formed is then heated to about 65° C. for about 3.5 hours to effect the desired methanolysis. The reaction is initiated in reactor 6 and completed in a reactor 7 which is connected in series therewith by a line 8. The rate of flow through said reactors is controlled to provide a sufficient period of time to ensure completeness of the reaction. Reactors 6 and 7 are connected, in parallel, with a light ends column 9 having a condenser 10 and a receiver 11 connected thereto. The reaction mixture is maintained under reflux and the overhead product taken off consists of some acetone and the methylal and the acetaldehyde produced in reactors 6 and 7.

The methanolized product is continuously withdrawn from reactor 7, neutralized with sodium hydroxide and the neutralized product passed through a line 12 to a stripping column 13 having a condenser 14 and receiver 15 connected thereto. The column residue consists of water, sodium sulfate, glycols, higher acetals and oxides while the overhead product consists of a mixture of methyl ethyl ketone, tetrahydrofuran, 2-methyl tetrahydrofuran, and a small amount of acetone and methanol. Water is added to the overhead mixture to act as a solvent for the acetone and methanol and the whole extracted with pentane in pentane extractor 16. The lower aqueous layer is continuously withdrawn and passed through a line 17 to a fractionating column 18 having a condenser 19 and a receiver 20. The methanol and any acetone are separated and recycled through a line 21 back to reactor 6. The sulfuric acid which acts as the methanolysis catalyst is mixed with the methanol recycle stream. The aqueous residue goes to the sewer. The pentane layer in extractor 16 is continuously withdrawn through a line 22 and introduced into a pentane recovery column 23 where the pentane is taken off overhead. The pentane circulated is sufficient to azeotrope out any methanol and acetone which may still be present. The pentane distillate is condensed in a condenser 24 and collected in a receiver 25. Part is employed as recycle to column 23 and the remainder recycled through a line 26 to extractor 16. A side stream of the product mixture is withdrawn from the reboiler 27 of column 23 and collected in a rundown tank 28. A second rundown tank 29 is also provided and connected in parallel to supply additional receiver capacity, if necessary. From rundown tank 28, the product mixture, now free of formals, acetals and oxides, is passed through a line 30 to the reboiler 31 of a batch still 32 where the tetrahydrofuran is distilled off after which the methyl ethyl ketone is distilled. A condenser 33 is connected to batch still 32 and receivers 34, 35 and 36 are provided for the products. In lieu of a batch still a front end and finishing column for tetrahydrofuran and a front end and finishing column for the methyl ethyl ketone (none of which are shown) may be provided if the flow rates are sufficient to warrant the use of a continuous operation in the final separation and purification.

It is to be understood that the foregoing detailed description is given merely by way of illustration and that many variations may be made therein without departing from the spirit of my invention.

Having described by invention, what I desire to secure by Letters Patent is:

1. In a process for the separation of methyl ethyl ketone and tetrahydrofuran from a mixture of reaction products obtained in the vapor phase oxidation of hydrocarbons, said mixture comprising essentially methyl ethyl ketone, tetrahydrofuran, 2-methyl tetrahydrofuran, formals, acetals and cyclic oxides in solution in pentane, the improvement which consists in distilling off the pentane, heating the residue and removing therefrom the fraction boiling up to 75° C., said fraction containing methyl ethyl ketone, tetrahydrofuran, 2-methyl tetrahydrofuran and formals and reduced amounts of acetals and cyclic oxides, reacting said fraction with methanol in the presence of an inorganic acid methanolysis catalyst at a methanolysis reaction temperature whereby the formals, acetals and cyclic oxides present therein are hydrolyzed and the formals and acetals converted to methylal, methyl acetals and conversion products thereof, separating the methylal and acetal conversion products from the methanolysis conversion product, and then separating the methyl ethyl ketone and tetrahydrofuran from the mixture remaining.

2. In a process for the separation of methyl ethyl ketone and tetrahydrofuran from a mixture of reaction products obtained in the vapor phase oxidation of hydrocarbons, said mixture comprising essentially methyl ethyl ketone, tetrahydrofuran, 2-methyl tetrahydrofuran, formals, acetals and cyclic oxides in solution in pentane, the improvement which consists in distilling off the pentane, heating the residue and removing therefrom the fraction boiling up to 75° C., said fraction containing methyl ethyl ketone, tetrahydrofuran, 2-methyl tetrahydrofuran and formals and reduced amounts of acetals and cyclic oxides, reacting said fraction with methanol in the presence of an inorganic acid methanolysis catalyst at a methanolysis reaction temperature whereby the formals, acetals and cyclic oxides present therein are hydrolyzed and the formals and acetals converted to methylal, methyl acetals and conversion products thereof, neutralizing the inorganic acid methanolysis catalyst, separating the acetals and formals and any water, salts and glycols formed during the methanolysis reaction, and then separating the methyl ethyl ketone and tetrahydrofuran from the mixture remaining.

3. In a process for the separation of methyl ethyl ketone and tetrahydrofuran from a mixture of reaction products obtained in the vapor phase oxidation of hydrocarbons, said mixture comprising essentially methyl ethyl ketone, tetrahydrofuran, 2-methyl tetrahydrofuran, formals, acetals and cyclic oxides in solution in pentane, the improvement which consists in distilling off the pentane, heating the residue and removing therefrom the fraction boiling up to 75° C., said fraction containing methyl ethyl ketone, tetrahydrofuran, 2-methyl tetrahydrofuran and formals and reduced amounts of acetals and cyclic oxides, reacting said fraction with methanol in the presence of 1 to 10% by weight of sulfuric acid as a methanolysis catalyst at a methanolysis reaction temperature whereby the formals, acetals and cyclic oxides present therein are hydrolyzed and the formals and acetals converted to methylal, methyl acetals and conversion products thereof, separating the methylal and acetal conversion products from the methanolysis conversion product, and then separating the methyl ethyl ketone and tetrahydrofuran from the mixture remaining.

4. In a process for the separation of methyl ethyl ketone and tetrahydrofuran from a mixture of reaction products obtained in the vapor phase oxidation of hydrocarbons, said mixture comprising essentially methyl ethyl ketone, tetrahydrofuran, 2-methyl tetrahydrofuran, formals, acetals and cyclic oxides in solution in pentane, the improvement which consists in distilling off the pentane, heating the residue and removing therefrom the fraction boiling up to 75° C., said fraction containing methyl ethyl ketone, tetrahydrofuran, 2-methyl tetrahydrofuran and formals and reduced amounts of acetals and cyclic oxides, reacting said fraction with methanol in the presence of 1 to 10% by weight of sulfuric acid as a methanolysis catalyst at a methanolysis reaction temperature whereby the formals, acetals and cyclic oxides present therein are hydrolyzed and the formals and acetals converted to methylal, methyl acetals and conversion products thereof, neutralizing the inorganic acid methanolysis catalyst, separating the acetals and formals and any water, salts and glycols formed during the methanolysis reaction, and then separating the methyl ethyl ketone and tetrahydrofuran from the mixture remaining.

5. In a process for the separation of methyl ethyl ketone and tetrahydrofuran from a mixture of reaction products obtained in the vapor phase oxidation of hydrocarbons, said mixture comprising essentially methyl ethyl ketone, tetrahydrofuran, 2-methyl tetrahydrofuran, formals, acetals and cyclic oxides in solution in pentane, the improvement which consists in distilling off the pentane, heating the residue and removing therefrom the fraction boiling up to 75° C., said fraction containing methyl ethyl ketone, tetrahydrofuran, 2-methyl tetrahydrofuran and formals and reduced amounts of acetals and cyclic oxides, reacting said fraction with methanol in the presence of 1 to 10% by weight of sulfuric acid as a methanolysis catalyst for 0.5 to 10 hours at a temperature of 50 to 85° C. whereby the formals, acetals and cyclic oxides present therein are hydrolyzed and the formals and acetals converted to methylal, methyl acetals and conversion products thereof, neutralizing the sulfuric acid methanolysis catalyst, separating the acetals and formals and water, salts and glycols formed during the methanolysis reaction and then separating the methyl ethyl ketone and the tetrahydrofuran from the mixture remaining.

6. In a process for the separation of methyl ethyl ketone and tetrahydrofuran from a mixture of reaction products obtained in the vapor phase oxidation of hydrocarbons, said mixture comprising essentially methyl ethyl ketone, tetrahydrofuran, 2-methyl tetrahydrofuran, formals, acetals and cyclic oxides in solution in pentane, the improvement which consists in distilling off the pentane, heating the residue and removing therefrom the fraction boiling up to 75° C., said fraction containing methyl ethyl ketone, tetrahydrofuran, 2-methyl tetrahydrofuran and formals and reduced amounts of acetals and cyclic oxides, reacting said fraction with methanol in the presence of 1 to 10% by weight of sulfuric acid as a methanolysis catalyst for 0.5 to 10 hours at a temperature of 50 to 85° C. whereby the formals, acetals and cyclic oxides present therein are hydrolyzed and the formals and acetals converted to methylal, methyl acetals and conversion products thereof, neutralizing the sulfuric acid methanolysis catalyst, separating the acetals and formals and water, salts and glycols formed during the methanolysis reaction, extracting the remaining mixture with pentane, distilling the pentane extract to azeotrope out any methanol and acetone present, and then separating the methyl ethyl ketone and the tetrahydrofuran from the mixture remaining.

NAT C. ROBERTSON.

REFERENCES CITED

The following references are of record in the file of this patent:

UNITED STATES PATENTS

| Number | Name | Date |
| --- | --- | --- |
| 1,894,097 | James | Jan. 10, 1933 |
| 1,907,822 | James | May 9, 1933 |
| 2,054,979 | Jahrstorfer et al. | Sept. 22, 1936 |
| 2,211,626 | Loder et al. | Aug. 13, 1940 |
| 2,392,316 | Dreyfus | Jan. 8, 1946 |